Figure 6:
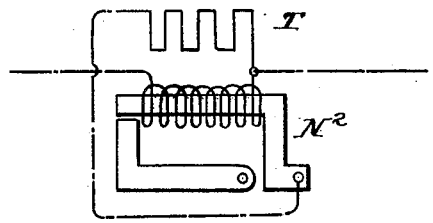

No. 612,629. Patented Oct. 18, 1898.
J. D. IHLDER.
MEANS FOR CONTROLLING OPERATIONS OF ELECTRIC MOTORS.
(Application filed Jan. 26, 1898.)
(No Model.) 4 Sheets—Sheet 1.
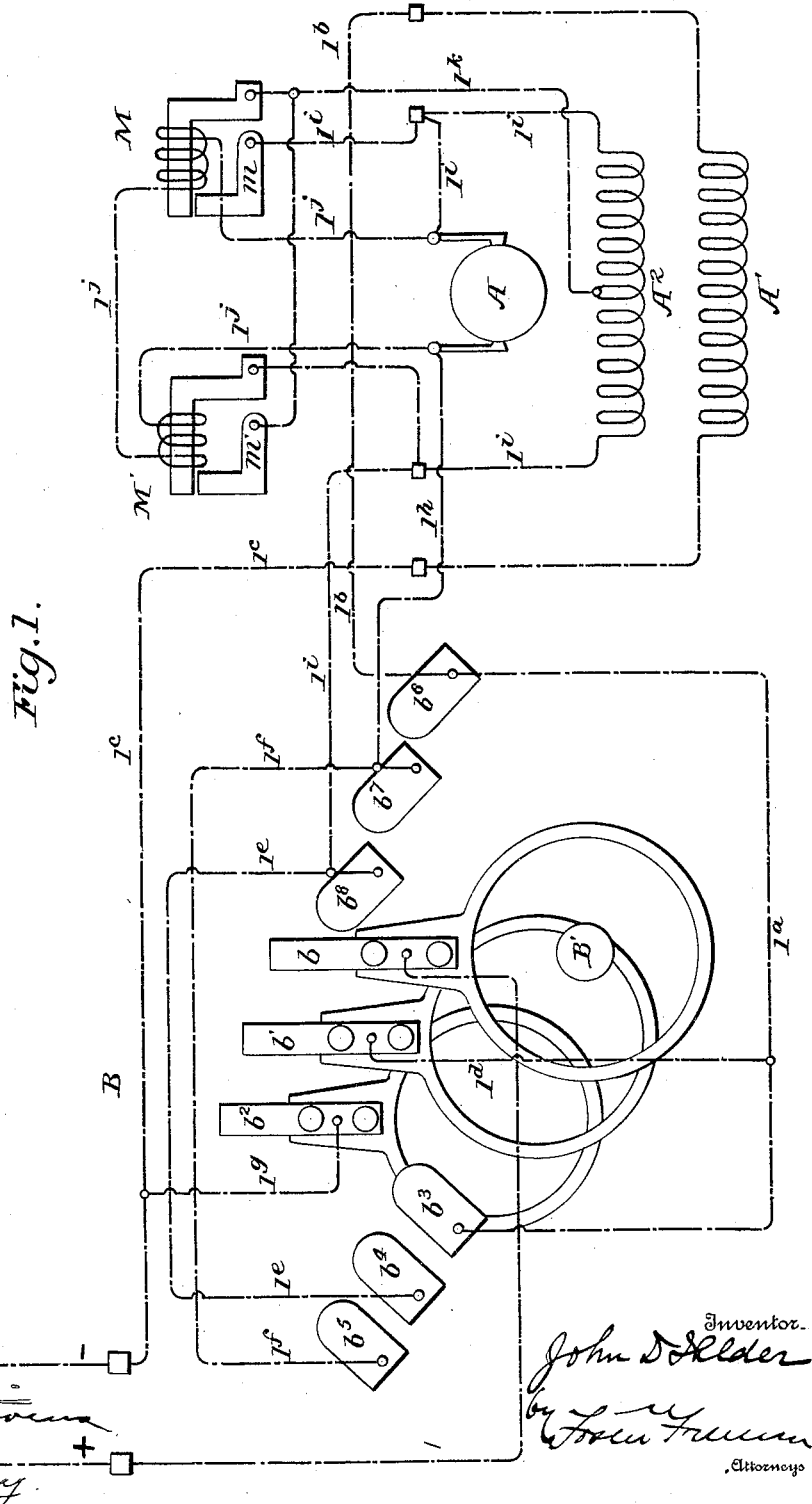

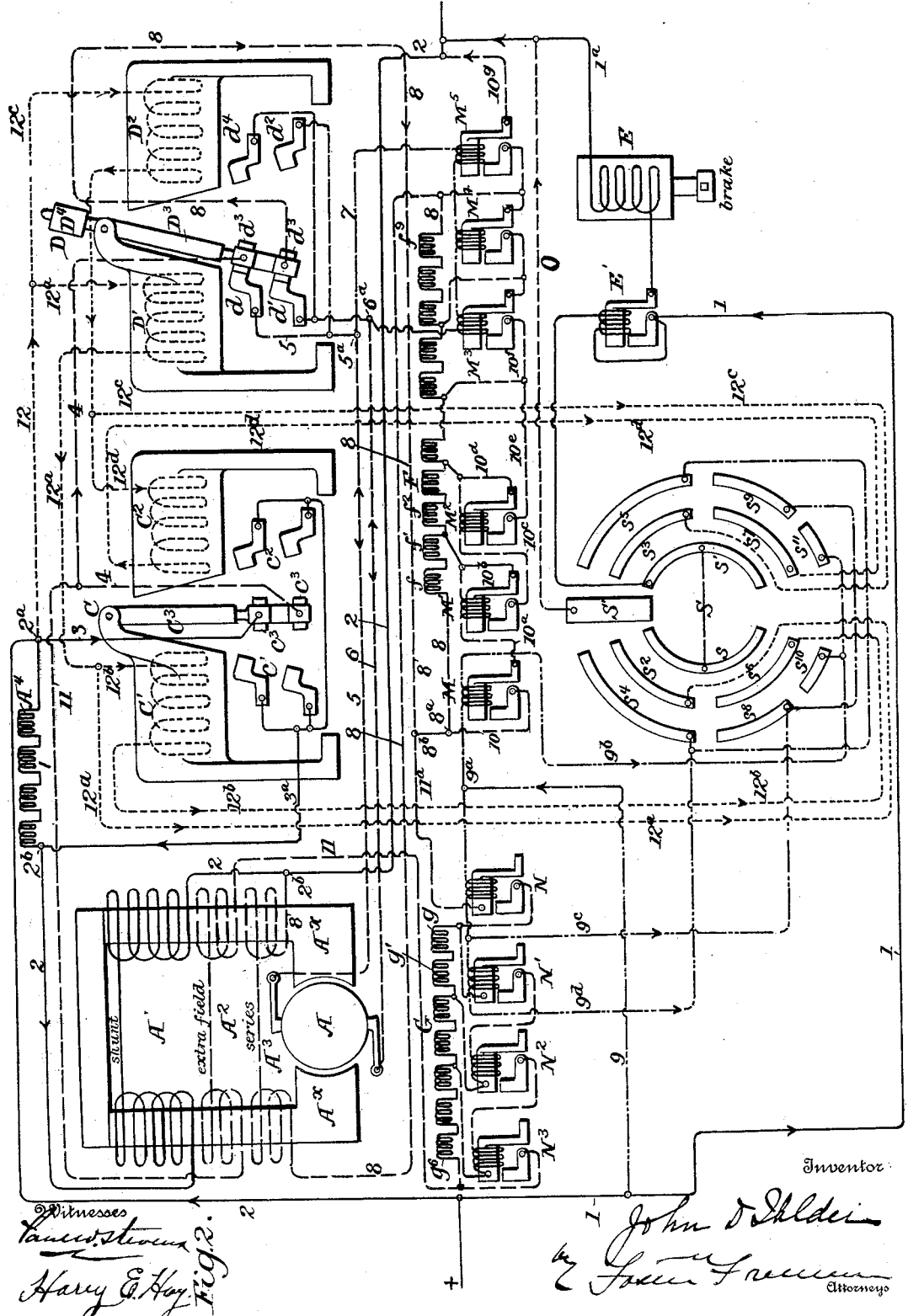

No. 612,629. Patented Oct. 18, 1898.
J. D. IHLDER.
MEANS FOR CONTROLLING OPERATIONS OF ELECTRIC MOTORS.
(Application filed Jan. 26, 1898.)
(No Model.) 4 Sheets—Sheet 3.
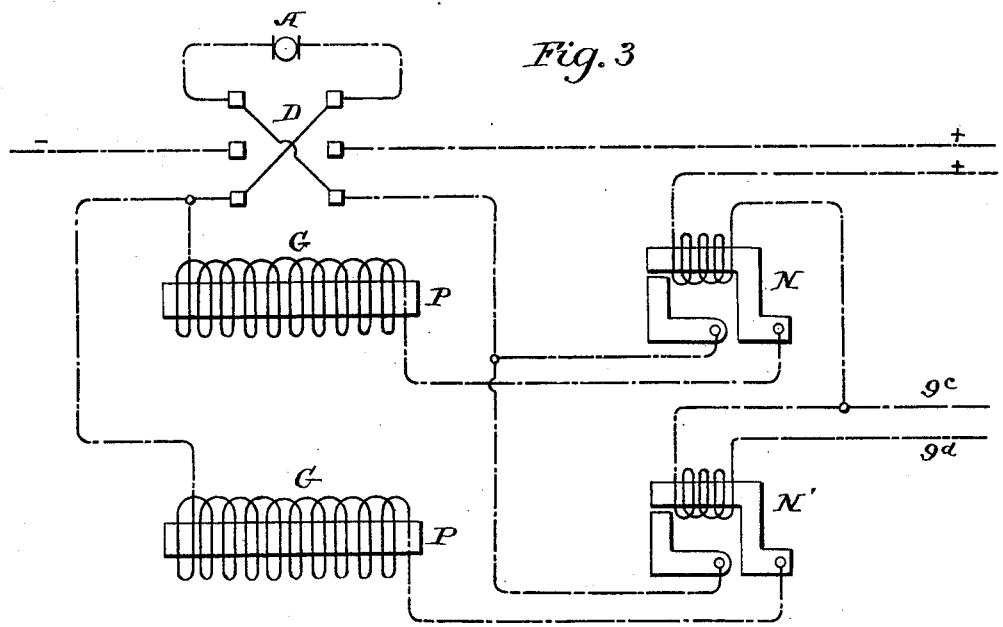
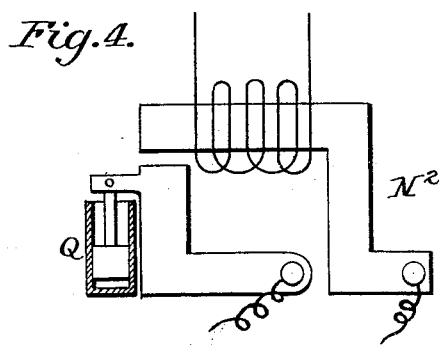
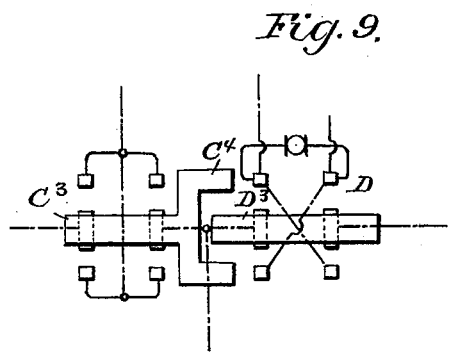
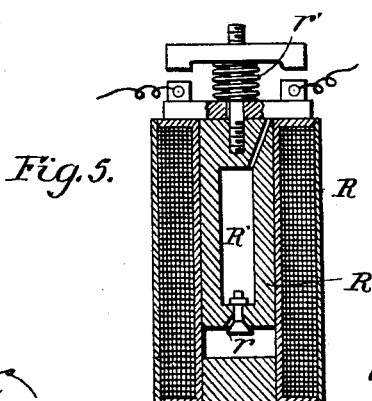

No. 612,629. Patented Oct. 18, 1898.
J. D. IHLDER.
MEANS FOR CONTROLLING OPERATIONS OF ELECTRIC MOTORS.
(Application filed Jan. 26, 1898.)
(No Model.) 4 Sheets—Sheet 4.

Witnesses
Inventor

UNITED STATES PATENT OFFICE.

JOHN D. IHLDER, OF YONKERS, NEW YORK, ASSIGNOR TO THE OTIS BROTHERS & COMPANY, OF NEW YORK, N. Y.

MEANS FOR CONTROLLING OPERATION OF ELECTRIC MOTORS.

SPECIFICATION forming part of Letters Patent No. 612,629, dated October 18, 1898.

Application filed January 26, 1898. Serial No. 668,059. (No model.)

*To all whom it may concern:*

Be it known that I, JOHN D. IHLDER, a citizen of the United States, residing at Yonkers, in the county of Westchester and State of New York, have invented certain new and useful Improvements in Means for Controlling the Operation of Electric Motors, of which the following is a specification.

My invention relates to means for controlling the operation of electric motors, and while it is applicable to motors of all kinds and for all purposes it is more especially adapted for controlling electric motors connected to operate elevators; and it has for its object to provide improved means whereby the starting and stopping of the electric motor are readily and thoroughly controlled; and to these ends it consists in the various features of construction and arrangement of parts having the general mode of operation substantially as hereinafter more particularly pointed out.

Referring to the accompanying drawings, Figure 1 is a diagrammatic representation showing one embodiment of certain features of my invention. Fig. 2 is a diagrammatic representation showing another embodiment of the invention, and Figs. 3 to 9 are diagrammatic representations of modified devices and appliances which may be used in carrying out the various features of invention.

While, as above indicated, the invention is applicable to many and various uses in connection with electric motors, the general principles of the invention can be well understood by describing and illustrating embodiments thereof connected with motors adapted to operate elevators, and I will use such an embodiment as a typical illustration of the invention, describing the preferred forms of construction and arrangement of parts and pointing out their mode of operation, so that those skilled in the art will be enabled to apply my invention to the various purposes for which it is adapted, and it will be understood that in thus describing this special application I do not limit the invention thereto nor to the use of the particular styles or forms of devices indicated.

It is well known that in starting an electric motor if the current is at once turned on fully it is liable to injure or destroy the parts, and it has been customary to provide means to allow the current to flow to the motor gradually, and as the motor starts and attains a greater speed it produces counter electromotive force in inverse proportion to the load and resistance in the circuit, and the current can be supplied in this way until it reaches the full amount for which the motor is adapted.

In order to admit the current gradually, it has been customary to include a certain amount of resistance in the motor-circuit or more especially in the armature-circuit and to gradually short-circuit or cut out this starting resistance, and heretofore this has been accomplished by means of a brush sliding over a series of contacts connected to sectional resistances, so that the resistances are short-circuited or cut out of the circuit as the brush moves over the various contacts. While this is a practical means, I have found that it is troublesome, and more especially so where comparatively large currents are employed, as the brushes and contacts become roughened, which prevents their free movement and perfect operation, and they become worn and otherwise injured, so that they do not operate satisfactorily, and it is with the object of overcoming this difficulty that my present invention is made.

Broadly stated, one feature of my invention consists in the use of a series of electromagnets which are arranged and connected so that they control the resistances in the motor-circuit, cutting them in or out successively and gradually, as required, and these magnets, I have found, operate most satisfactorily, overcoming the objections to the sliding brushes, reducing the sparking which is incident to the use of brushes, operating with greater certainty and less wear and tear, and being an exceedingly cheap and effective means of accomplishing the desired results. Moreover, I find that owing to the advantages above set forth a less number of sections of resistance may be used in connection with the magnets than with the rubbing contacts and the same result will be accomplished in a better manner without deterioration of the parts, and this is due in part to the fact that the magnets preferably short-circuit the resistance without breaking the current. These magnets are so adjusted that they operate their cores or armatures which control the resistances when predetermined currents flow through the coils of the magnets or when a predetermined electromotive force is applied to the terminals of the coils of the magnets, and the magnets are arranged to be controlled manually by the operator on the car or automatically by the current itself or partly manually and partly automatically.

The number of electromagnets to be used of course depends much upon the nature of the work which the motor has to do and on the amount of current which it is permissible to use. The less torque the motor has to develop at starting and the larger the permissible current fluctuation the less the number of magnets required; but it will be readily seen that the most exacting requirements can be fulfilled by using the requisite number of magnets, and they can be used in connection with shunt, compound, or other wound motors. In certain classes of work, and more especially in elevator-work, it is not only desirable but practically necessary to start the motor quickly and yet to start it without producing jars or sudden impulses, and it is also desirable to stop the motor without producing these unpleasant and sometimes dangerous effects, and to fulfil these conditions fully I use, in addition to a series of starting-magnets, a series of magnets which control the stopping of the motor—as, for instance, magnets which control a parallel circuit to the armature containing resistance, and by means of the magnets the resistance is successively and gradually reduced and inversely the brake power of the armature is increased.

In Fig. 1 I have illustrated, diagrammatically, one of the simplest embodiments of my invention in which it is used to start a stationary motor which stops whenever the power is cut off or when a brake is applied, and I have shown the invention as controlling the starting-resistance only of the motor. In this figure A represents the armature of the motor, which may be connected in any desired way to operate an elevator or for other purposes, and A' represents the shunt field-magnet coils, a shunt field-motor being used as typical in this connection, although any other form of motor can be used. Plus and minus represent the feeding-mains supplying current to the motor, and interposed between the mains and the motor is some kind of a switch—mechanical or electrical—and of any well-known construction (represented in the drawings at B) and adapted to close the mains and to reverse the direction of the current through the field-magnet coils or the armature to cause the motor to operate in the desired direction. As shown, this switch comprises a shaft B', carrying three contact-arms $b\ b'\ b^2$, adapted to engage either one of a set of contacts $b^3\ b^4\ b^5$ or $b^6\ b^7\ b^8$, according as it is turned in one direction or the other. As arranged in the drawings, from the plus terminal extends a conductor 1, leading to the contact-arm $b$, which is adapted to engage either contact $b^3$ or $b^6$, which are connected together by a conductor $1^a$ and from which contacts leads a conductor $1^b$, including the shunt field-magnet coils A', which by means of conductor $1^c$ are connected to the minus terminal. Branching from the conductor $1^a$ is a conductor $1^d$, leading to the contact-arm $b'$, which is adapted to engage either of the contacts $b^4\ b^7$. The contact $b^4$ is connected by conductor $1^e$ with the contact $b^8$, and contact $b^7$ is connected by conductor $1^f$ with the contact $b^5$, and the contact-arm $b^2$ is connected by conductor $1^g$ with the conductor $1^c$. The contact $b^7$ is connected by conductor $1^h$ to one of the brushes of the armature A, while the conductor $1^i$ connects contact $b^8$ with the resistance $A^2$ and with the other brush of the armature A. This resistance $A^2$ may be in various forms and arranged in various ways well understood by those skilled in the art and is shown in the present instance in series with the armature-circuit.

In the present instance I have shown two electromagnets M M', they being indicated as of a typical form, in which the cores and armatures are connected to circuit-terminals, while their coils are in the present instance connected in series in a branch circuit $1^j$ around the armature A of the motor. The armature $m$ of the magnet M is connected to conductor $1^i$ of the resistance $A^2$, and the core of the magnet M is connected by conductor $1^k$ to some point intermediate the terminals of the resistance $A^2$. The armature $m'$ of the magnet M' is connected to the core of the magnet M, and the core of the magnet M' is connected to the conductor $1^i$ outside of the resistance $A^2$. With this arrangement, assuming that the switch B is operated so that, for instance, the contact-arm $b$ engages the contact $b^3$ and the other contact-arms their respective contacts of the series, the circuit from the terminals will be closed through the conductor 1, contact-arm $b$, contact $b^3$, conductor $1^a$, conductor $1^b$, shunt field-magnet coils A', conductor $1^c$ to the minus terminal. A branch current will flow from conductor $1^a$ through conductor $1^d$ to contact-arm $b'$, contact $b^4$, conductor $1^e$, contact $b^8$, conductor $1^i$, through the resistance $A^2$, to the armature A and by conductor $1^h$ to contact $b^7$, conductor $1^f$, contact $b^5$, contact-arm $b^2$, conductor $1^g$ to the minus terminal, and the motor will operate in a certain direction. When the armature-circuit is closed, the parallel circuit $1^j$, including the coils of the magnets M M', is energized, and these magnets are so wound or adjusted or otherwise arranged that when the armature of the motor develops a certain amount of counter electromotive force the magnet M will attract its armature $m$, short-circuiting a portion of the resistance $A^2$, and as the counter electromotive force increases the magnet M' will be energized to operate its armature $m'$ and short-circuit the entire resistance $A^2$, and by this time it is supposed that the motor has attained its proper speed and is capable of receiving the full amount of current supplied thereto. Of course it will be understood that any number of magnets M and M', similarly arranged, may be introduced into the parallel circuit $1^j$, and the resistance $A^2$ may be subdivided into any number of divisions controlled by the magnets, and it will also be understood that instead of including the coils of the magnets M M' in series they may be in separate branch or parallel circuits or in any other arrangement or combination of circuits, and they may be arranged and adjusted in any of the well-known ways, so that they will operate under various potentials and in proper order and succession to short-circuit or eliminate the armature-resistance and cause the motor to start gradually and quickly without jar and without deterioration of the magnets or other parts of the apparatus.

In Fig. 2 I have shown, diagrammatically, a more complete and extended embodiment of my invention adapted more particularly for elevator-work and especially where it is desirable that the elevator-car should travel at high speed and be capable of carrying large loads and where it is necessary to start and stop the car quickly but gradually without jar or jolt, and I have shown one embodiment of such an arrangement which is well adapted to illustrate the principles and advantages of my invention. Referring to this figure, A is the armature of the motor, and $A^\times$ are the field-magnet poles thereof. A' represents the shunt field-magnet coils; $A^2$, a portion of the armature-resistance, shown in the present instance as extra field-magnet coils, and $A^3$ the series field-magnet coils of the motor, I having chosen a compound-wound motor of this type to illustrate the invention. In this figure I have indicated a circuit making and breaking switch C, comprising, essentially, two magnets $C'$ $C^2$ and an interposed armature $C^3$, carrying double contacts $c^3$, arranged to engage the contacts $c'$ $c^2$, respectively, as it is moved to one side or the other. This switch in the present instance makes and breaks the armature-circuit and varies the shunt field-magnet circuit of the motor A, as I have chosen to illustrate the shunt field-magnet coils as being always energized, there being a resistance $A^4$ arranged in the feeding-circuit, which is normally included in the shunt field-magnet circuit when the breaking-switch C is open, but which resistance is short-circuited when the break-switch is closed.

I have also shown an armature-reversing switch D, comprising, essentially, magnets $D'$ $D^2$ and armature $D^3$, which latter is preferably so constructed that by the weight of the armature or by other means its contacts $d^3$ remain in engagement, respectively, with the contacts $d$ $d'$ or $d^2$ $d^4$, until it is positively operated to break the contacts, and I have indicated a counterweight $D^4$ as one means of accomplishing this result. This armature-reversing switch is also preferably restricted, so that its armature cannot make contact with its opposite contacts except in harmony with the position of the armature of the breaking-switch C, so that the direction of the current through the armature of the motor will be primarily controlled by the movements of the armature of the breaking-switch, and this is illustrated diagrammatically in Fig. 9. In this figure the armature $C^3$ of the breaking-switch C is provided with a yoke $C^4$, the arms of which embrace the armature $D^3$ of the armature-reversing switch D, so that if, for instance, the armature $C^3$ is moved to one side or the other to engage its respective contacts the yoke will be in such a position that the armature $D^3$ of the reversing-switch can only engage the corresponding set of contacts, but cannot engage the opposite set, and this is clearly illustrated in said Fig. 9, so as to need no further detailed description. It will be understood that this is a refinement of my invention and other means for accomplishing the same result may be used.

In Fig. 2 I have also shown a brake-magnet E, controlling the ordinary brake of an elevator or other machine, and this in turn is controlled by a magnet $E'$, connected to the controlling-switch S, which in elevator service is usually arranged upon the car, and this brake-magnet switch is in a shunt-circuit around the motor and is arranged in the usual way, so that when the magnet E is not energized the brake is applied, and when the current passes through the coils of the magnet E its core or armature operates the brake to release it from engagement with the brake-wheel in a manner well understood.

I have also shown an armature-resistance F, arranged in series sections $f\ f'\ f^2\ f^3\ f^4\ f^5\ f^6\ f^7\ f^8\ f^9$, and this may be used alone or in circuit with the series field-magnet coils $A^3$, the latter arrangement being indicated in the drawings. This resistance is controlled by the magnets M M' $M^2$ $M^3$ $M^4$ $M^5$, they being connected to different parts of the resistance F, to include more or less of the sections $f$ to $f^9$, and are conveniently designated as the "starting-magnets." In this instance I have shown the magnets M M' $M^2$ as being under the control of the operator through the medium of the controlling-switch S, while the magnets $M^3$ $M^4$ $M^5$ are automatically operated by variations in the potential of the armature-circuit, with terminals across the armature-circuit, although, of course, the coils may be independent of each other, as in direct shunts to the armature, but I prefer the series winding, as a larger-sized wire is permissible. These magnets are arranged to respond to different potentials in any well-known manner, as by varying the number of turns on the coils of the magnets or by adjusting the armatures or cores with relation to each other or otherwise.

I have also shown a resistance G, comprising sections $g$ $g'$ $g^2$ $g^3$ $g^4$ $g^5$ $g^6$, and this is shown as connected in series with the extra field-magnet coils $A^2$ of the motor in such a way that when the circuit is closed the current flowing through the extra field-magnet coils $A^2$ assists in magnetizing the motor in the same sense as the shunt field-magnet coils $A'$ and gives an easy means of slow-speed running or gradual stopping of the motor. This resistance G is controlled by a series of magnets N N' $N^2$ $N^3$, which are conveniently designated as the "stopping-magnets" and are shown with their coils connected in series with each other.

I have also shown the controlling-switch S of typical form in which there is a brush or plate S', connected to the minus leading-in wire and adapted to be moved one way or the other over the various contact-plates $s$ $s'$ $s^2$ $s^3$ $s^4$ $s^5$ $s^6$ $s^7$ $s^8$ $s^9$ $s^{10}$ $s^{11}$.

I will now briefly outline the circuits, as shown in the embodiment of the invention illustrated in Fig. 2. Commencing with the plus leading wire there is a conductor 1, including the coils of the brake-magnet, the terminal of which is connected to the segment $s'$ of the switch S, the corresponding segment $s$ being connected thereto, so that whichever way the brush or plate S' moves it will close the circuit. From the magnet E' is a branch conductor $1^a$, including the coils of the brake-magnet E, operating the brake when magnet E' is closed, and this conductor $1^a$ connects with the minus leading wire. The brush or plate S' is also connected directly with the minus leading wire by a conductor O. Also leading from the plus terminal is a conductor 2, including the shunt-field resistance $A^4$ and the shunt field-magnet coils $A'$, thence extending to the minus leading wire, so that normally the resistance $A^4$ is included in the shunt field-magnet circuit of the motor. Leading from the conductor 2, as at a point $2^a$, is a conductor 3, extending to one of the double contacts $c^3$ of the armature $C^3$ of the making-and-breaking switch C. The contacts $c'$ $c^2$ are connected together, and by a conductor $3^a$ are connected to the conductor 2 at a point $2^b$, cutting out or short-circuiting the resistance $A^4$, and it will thus be seen that when the armature $C^3$ is in engagement with these contacts on either side the circuit is maintained through the shunt field-magnet coils $A'$, and the resistance $A^4$ normally in said circuit is eliminated. Leading from the contacts $c^3$ (one or both) is a conductor 4, connected with one of the double contacts $d^3$ of the armature $D^3$ of the armature-reversing switch D. The contacts $d$ $d^2$ are connected together, and the contacts $d'$ and $d^4$ are connected in the usual way for reversing the direction of the current through the motor. Leading from the contact $d$ is a conductor 5, including one of the brushes of the armature A, and from the other brush is a conductor 6, connected to the contact $d'$. Branching from the conductor 5, at a point $5^a$, is a conductor 7, including in the present instance the coils of the magnets $M^5$ $M^4$ $M^3$, and connecting with the conductor 6 at the point $6^a$, so that the operating-coils of these magnets are in a loop or branch of the armature-circuit 5 6.

Leading from one of the contacts $d^3$ of the armature $D^3$ is a conductor 8, including the resistance-coils $f$ to $f^9$, and thence including the series field-magnet coils $A^3$ of the motor and thence connecting with the conductor 2 at the point $2^b$, and hence of course to the minus leading wire.

Leading from the plus terminal is a conductor 9 to a point $9^a$, where one branch includes the coils of the magnet M and is extended by the conductor $9^b$ to the segments $s^{10}$ $s^{11}$ of the switch S, and another branch includes the coils of the magnet N and is extended by conductor $9^c$ to the segments $s^8$ $s^9$ of the switch S, which are connected together. This branch is further extended in the present instance to include the coils of magnet N', and by a conductor $9^d$ leads to the segments $s^4$ $s^5$ of the switch S, which are connected together, and it will thus be seen that the circuits through the coils of the magnets N and N' in the present instance are directly controlled by the operator's switch S, and it will be understood that any number of these starting or stopping magnets, respectively, may be so controlled as desired. The coils of the starting-magnets M' $M^2$ are in the present instance in a branch or shunt conductor 10, leading from conductor 8 at the point $8^a$, which is connected to the armature of magnet M, and the field or pole of which magnet is connected by conductor $10^a$ to include the coils of the magnet M', and thence to short-circuit some of the resistance-coils, as $f$ $f'$. A branch conductor $10^b$ includes the field of the magnet M', and leading from the armature thereof is a conductor $10^c$, including the coils of the magnet $M^2$ and connected to the conductor 8 around other resistance-coils, as $f^2$ $f^3$, and branching from this is a conductor $10^d$, connected to the field of the magnet $M^2$, the armature of which is connected by conductor $10^e$ to short-circuit other coils of the resistance device F, while a branch $10^f$ includes the armature of the magnet $M^3$, the field of which is connected to the armature of magnet $M^4$, and the field of this magnet $M^4$ is connected likewise to the armature of magnet $M^5$, and so on, each magnet being arranged to cut out more or less of the resistance-coils, while the field of magnet $M^5$ is connected by conductor $10^g$ to the minus line.

Branching from the armature-conductor 4 is a conductor 11, including the extra field-magnet coils $A^2$ of the motor and including the stopping-resistance G and connecting in the present instance to the conductor 8 at the point $8^b$. The resistance-coils $g$ to $g^6$ of the resistance G are controlled by the magnets N to $N^3$, the portion $11^a$ of the conductor 11 including the field and armature of the magnet N, the armature $n$ thereof being connected outside of the resistance-coil $g$, while magnet N' is arranged to cut in or out a number of the resistance-coils, as $g$ $g'$, and the magnets $N^2$ $N^3$ are arranged to control the other resistance-coils, and it will be observed that in the present instance magnets N and N' are controlled from the switch, while magnets $N^2$ $N^3$ are automatically controlled by variations of potential or current strength.

Branching from the conductor 2, as at the point $2^a$, is a conductor 12, having a branch $12^a$, including the coils D' of the armature-reversing switch D and leading to the segment $s^2$ of the controlling-switch, and from this branch $12^a$ is another branch $12^b$, including the coils C' of the breaking-switch C and leading to the segment $s^6$ of the switch. There is also a branch $12^c$, including the coils of the magnet $D^2$ of the armature-reversing switch and leading to the segment $s^3$ of the switch, while an extension branch $12^d$ includes the coils of the magnet $C^2$ of the breaking-switch and leads to the segment $s^7$ of the switch.

The various circuits are shown in various styles of lines as far as practicable to distinguish their character and to aid in tracing them. Thus the field-magnet circuit and the brake-magnet circuit are shown in continuous lines, while the armature-circuit in general is shown in lines made up of dashes, the breaking-switch and armature-reversing-switch circuits being shown in lines made of dots, and so on.

The operation of the parts will be readily understood by those skilled in the art and may be briefly described in general as follows: Supposing the parts to be in the position shown in the drawings, the operator moves the brush or plate $s'$ to the right or the left, according as he desires the elevator to go up or down, and assuming that he moves it to the left, for instance, when it comes in contact with the segment $s$ the circuit 1, including the magnet E', is completed and its armature operated to close the circuit through magnet E, which releases the brake and holds it released as long as the brush is on the segment $s$. When the brush reaches the segment $s^2$, the circuit, including conductors 2 and 12, the coil D', and conductor $12^a$, is completed, and the armature $D^3$, if not already in the position shown in the drawings, is moved thereto, closing the armature-circuit through the motor in the desired direction. The plate S', coming in contact with the segment $s^4$, temporarily closes the circuit through the conductors 1, 9, and $9^d$. As the brush S' reaches the segment $s^6$ it closes the branch circuit $12^b$ through the coil C' of the circuit-breaking switch C, moving the armature $C^3$ to the left, which closes the circuit through the conductors 2, 3, and $3^a$, cutting out the shunt-resistance $A^4$ through the shunt field-magnet coils A', and to the minus terminal. At the same time the armature-circuit is closed through conductor 4 to the armature $D^3$ of the armature-reversing switch D, through contact $d$, conductor 5, to the armature of the motor, conductor 6, contact $d'$, conductor 8, through the resistances $f$ $f^9$, through the series field-magnet coils $A^3$, to the conductor 2, to the minus terminal. When the brush S' reaches the segment $s^8$, it closes a branch circuit from the conductor 9 through conductor $9^c$, and when the brush reaches the segment $s^{10}$ it closes a circuit through the conductor 9, around the coils of the magnet M, through conductor $9^b$. This energizes the magnet M, causing its armature to close a branch circuit from the conductor 8, through the conductor 10, including the coils of the magnet M', and cutting out or short-circuiting a portion of the resistance F, as the coils $f$ $f'$. This in turn energizes the magnet M', causing its armature to be attracted and closing the circuit through the conductor $10^b$, including the coils of the magnet $M^2$, and cutting out or short-circuiting more of the resistance F, and this again energizes the magnet $M^2$, closing the circuit $10^d$, and more resistance is cut out. The coils of the magnets $M^3$ $M^4$ $M^5$, as before stated, are in a loop-circuit 7 between the conductors 5 and 6, and the operation of these magnets is dependent upon the variations of potential in the armature-circuit and is automatic, and more or less of the resistance F is cut in or out accordingly. It will thus be seen that the magnets M M' $M^2$ are under the control of the operator, while the remaining magnets are actuated automatically by the potential of the armature-circuit, and by properly controlling the action of magnets M M' $M^2$ the operator is enabled to start the heaviest load and to give rapid acceleration without jolt or jar.

When it is desired to stop the motor, the brush S' is moved in the reverse direction, and if, for instance, the brush rests upon segments $s^{10}$ and $s^8$, energizing the magnets M and N, the speed of the motor is reduced, and if it is moved progressively, so as to rest upon segments $s^8$ and $s^4$, the speed is further reduced and the magnets $N^2$ $N^3$ are brought into operation, so that large brake-power is applied to stop the armature, and as the brush is moved farther toward its normal position the car is quickly stopped without jolt or jar. Further tracing of the circuits under the various operations is deemed unnecessary; but it will be seen that with this construction the motor can be quickly started under the heaviest loads and without jolt or jar, and it can likewise be quickly and similarly stopped. In thus stopping the motor by the use of a parallel resistance to the armature it is necessary to reduce the resistance of the circuit to a small amount, and as it is impossible to close the circuit of the armature when running at full speed on such a small resistance without danger of causing a sudden jar in the car it is therefore necessary to reduce this resistance gradually, and this is done in a very short time—a part of a second—and by winding the magnets N² N³ in such a way that the current has to pass through one and attract its armature before the second magnet is energized. Of course more magnets may be thus connected when deemed necessary, or in large machines, where the brake-power must be extra heavy and the resistance reduced comparatively slowly, I use a special winding on these magnets, some forms or arrangements of which I will now describe, referring more particularly to Figs. 3, 4, 5, 6, 7, and 8. In Fig. 3 I have illustrated one way of accomplishing this result by means of a resistance with high self-induction, wherein the magnets N N' are shown in proper connection with the armature A. This resistance with high self-induction is practically embodied in the arrangement shown in Fig. 2, where the extra field-magnet coils A² constitute such an induction resistance, and in this instance it is wound on a motor which is normally running below saturation. The same results, however, can be produced by the arrangement shown in Fig. 3, where the resistance is wound on a separate iron core P, and more than one resistance may be employed, as P', and the connections may be made directly to the armature-terminals, as indicated in Fig. 3, so that the circuit reverses with the armature, and this has the advantage that if by some inadvertence the reversing-contacts of the armature should be disarranged the resistance-circuit is not affected. The parts are so lettered in this figure that further description of the circuits is not necessary. This same general result can be accomplished by the construction indicated in Fig. 4, wherein the armature of the motor is provided with a mechanical dash-pot Q, and it may likewise be accomplished by the structure indicated in Fig. 5, wherein is shown an iron-clad magnet R, with a hollow iron core R', with a valve $r$ at the bottom, the core being normally held open by a spring $r'$, and the arrangement is such that the valve opens when the core is released, allowing a rapid movement by giving free escape to the fluid from the core, and closes when the core is magnetized, giving a slow movement thereto, the fluid entering the core under restriction. The hollow iron core moves in a non-magnetic fluid-tight sleeve R², which is partly filled with a suitable fluid, such as oil, glycerin, &c. Magnets of the design indicated in Figs. 4 and 5 can be placed in the position occupied by the magnets N² N³ and produce the results stated. Another form of magnet which I have found useful in this connection is indicated in Fig. 6, which shows the magnet wound (in addition to the regular coil) with a parallel non-inductive resistance T.

Figure 7:
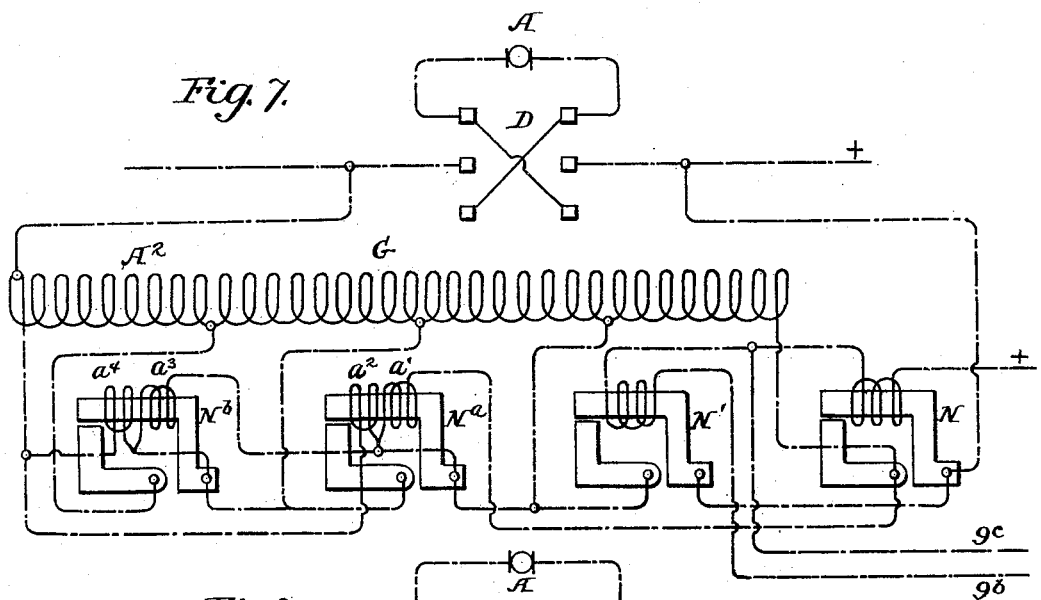

In Fig. 7 I have shown two magnets $N^a$ $N^b$, which are adapted to take the place of the magnets N² N³, and these are provided with opposing shunt-windings and are shown in connection with the resistance G and extra field-magnet resistance A². The operation of these magnets will be understood from the diagrams. The magnet N being operated to close the parallel armature-circuit, as before described, the magnets $N^a$ $N^b$ have their coils energized, but the two windings, being in opposition, practically neutralize each other, so that the magnets $N^a$ $N^b$ are not energized, or at least only to a slight degree, insufficient to attract their armatures. When through the operation of the car-switch magnet N' is energized and attracts its armature, the part $a'$ of the coil of magnet $N^a$ is short-circuited, $a^2$ alone being active, and the armature of this magnet is attracted and another portion of the resistance G is short-circuited or made inactive, and this short-circuits the part $a^3$ of the magnet $N^b$, leaving the portion $a^4$ active, and this attracts the armature of this magnet and short-circuits another part of the resistance, leaving in circuit only the extra field-magnet coils A². These circuits are clearly shown in the drawings and need not be traced in detail.

Figure 8:
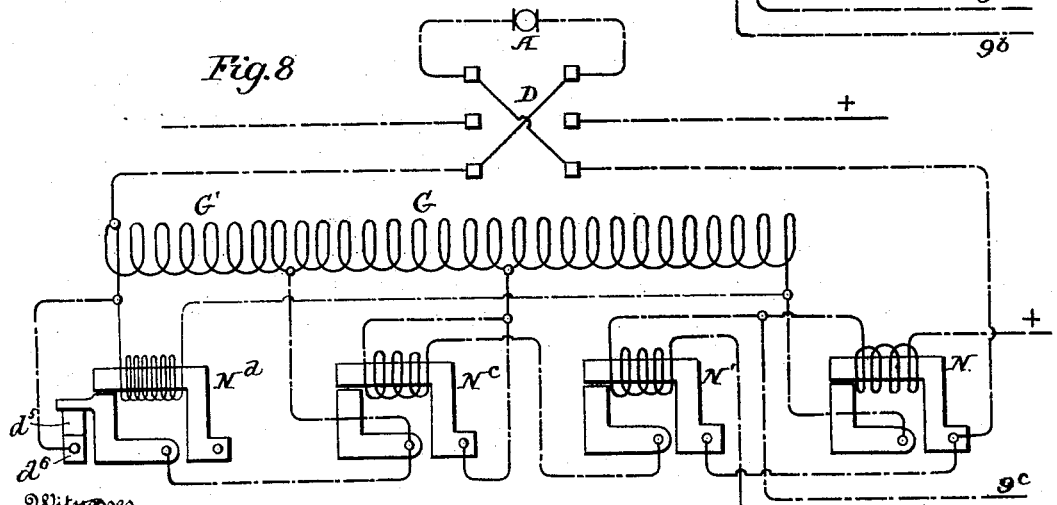

When it is desirable to reduce the resistance of the armature short circuit still lower and make sure that this will not be done at the time when the current flowing through the circuit is beyond a predetermined limit, I make use of a magnet with a high-resistance winding, which is arranged to operate to close its circuit when its armature is released. Such a construction is shown in Fig. 8. In this construction, as before, magnets N N' are under the control of the operator. Magnet $N^c$ is shown with a series winding, as in Fig. 2. Magnet $N^d$ has a high-resistance winding connected to the two terminals of the short-circuit resistance G. As long as this short-circuit resistance is open magnet $N^d$ has its armature open, with a back contact $d^5$, resting on a separate contact $d^6$, connected to the short-circuit resistance, while the armature-contact is connected at another place to the short-circuit resistance, including the portion that is to be cut out. As shown in Fig. 1, this portion is the last part G' not connected to the other magnets, so that in this case the motor-armature is completely short-circuited when all the magnets have performed their function. Before magnet N is excited the magnet $N^d$ short-circuits the resistance G', which is included between its terminals. This, however, is only a small part of the total resistance G G'; but as soon as magnet N attracts its armature magnet $N^d$ becomes energized, attracts its armature, and breaks the contacts $d^5$ and $d^6$. The coil of the magnet $N^d$ is so proportioned that the magnet will keep its armature in attraction even after magnet N' and magnet $N^c$ have short-circuited their part of the resistance G, leaving only the portion G' active, and it remains active as long as the current flowing through the resistance G' exceeds a predetermined amount, or as long as the motor-armature speed (which is in proportion to the current sent through the resistance G') exceeds a certain amount, and as soon as under the brake action of the current sent through the resistance G' the motor speed is reduced to a safe limit, the current flowing through the coils of magnet N$^d$ being sufficiently weakened, its armature drops, its contacts $d^5$ $d^6$ are closed, and thus the resistance G' is cut out.

From these illustrations, which are given as typical of modifications of my invention, it will be seen that many and various changes in construction and arrangement of the parts may be used by those skilled in the art, according to the requirements of any particular case, without departing from the general principles of my invention, and the invention, therefore, is not limited to the particular forms and arrangements shown. Not only can the devices shown be used in connection with each other, as illustrated in the drawings, but they can be combined in different ways and with different windings, and while I have shown the shunt field-winding as normally closed and including a resistance it is desirable to weaken the field as far as good practical operation will permit in each case, and sometimes even to break it completely, on account of economy of operation. In all of these arrangements, which have been tested and used by me, I find that the motor, even under heavy loads and traveling at high rates of speed and used in such connections, as with elevators, can be quickly and easily started and stopped without producing jars or jolts, and the most exacting requirements in connection with this class of work can be readily fulfilled.

What I claim is—

1. In a starting and stopping device for electric motors, the combination with the motor, of a resistance included in the circuit of the motor, and a series of electromagnets automatically operated according to the varying potential of the motor-armature arranged to control said resistance, substantially as described.

2. In a starting and stopping device for electric motors, the combination with the motor, of a resistance included in the circuit of the motor, a series of electromagnets automatically operated according to the varying potential of the motor-armature arranged to control the resistance, and a switch controlling the electromagnets, substantially as described.

3. In a starting and stopping device for electric motors, the combination with the motor, of a resistance connected with the motor, a series of electromagnets controlling the resistance, a switch controlling a portion of said electromagnets and a portion of the electromagnets arranged in the circuit to be automatically controlled by variations of potential in the circuit, substantially as described.

4. In a starting and stopping device for electric motors, the combination with the motor, of resistances connected in the circuit of the motor, two series of electromagnets controlling the resistances, one series for use in starting the motor and the other for stopping the motor, and means for controlling the electromagnets, substantially as described.

5. In a starting and stopping device for electric motors, the combination with the motor, of resistances connected in the circuit of the motor, two series of electromagnets controlling the resistances, one series for use in starting the motor and the other for stopping the motor, a switch for controlling part of the magnets of each series, and connections for automatically controlling the other magnets according to variations of potential in the circuit, substantially as described.

6. In a starting and stopping device for electric motors, the combination with the motor, of resistances included in the armature-circuit of the motor, electromagnets controlling said armature-resistances, and means for controlling the electromagnets, automatically operated according to the varying potential of the motor-armature substantially as described.

7. In a starting and stopping device for electric motors, the combination with the motor and circuits therefor, including a parallel circuit to the armature, of resistances in said parallel circuit, magnets controlling said resistances, and means for controlling the magnets, substantially as described.

8. In a starting and stopping device for electric motors, the combination with the motor and circuits therefor, including a parallel circuit to the armature, of resistance devices included in said parallel circuit, two sets of electromagnets controlling the resistance one for starting and the other for stopping, and means for controlling said electromagnets, substantially as described.

9. In a starting and stopping device for electric motors, the combination with the motor and circuits therefor, including a parallel circuit to the armature, of resistance devices included in said parallel circuit, two sets of electromagnets controlling the resistance one for starting and the other for stopping, and a switch controlling a portion of said magnets, the remaining magnets being automatically controlled by variations of potential in said circuit, substantially as described.

10. In a starting and stopping device for electric motors, the combination with the motor and circuits therefor, including a parallel circuit to the armature, of resistances in said parallel circuit including an extra field-coil, magnets controlling said resistances, and means for controlling the magnets, substantially as described.

11. In a starting and stopping device for electric motors, the combination with the motor and circuits therefor, of a circuit-breaking switch, an armature-reversing switch, a parallel circuit to the armature, resistances included in said parallel circuit, electromagnets controlling said resistances, a switch controlling a portion of said electromagnets, and circuits connected with the other electromagnets for controlling them by variations of potential in said circuit, substantially as described.

12. In a starting and stopping device for electric motors, the combination with a compound-wound motor, of a resistance included in the shunt field-magnet coils, a circuit-breaking switch, an armature-reversing switch, a circuit parallel to the armature, resistance devices including an extra field-magnet coil in said circuit, two sets of electromagnets controlling said resistances, and means for controlling said electromagnets, substantially as described.

13. In a starting and stopping device for electric motors, the combination with the motor and circuits therefor, including a parallel circuit to the armature, of resistance devices included in said circuit, and electromagnets controlling said resistance devices, one of the electromagnets being provided with a high-resistance winding and controlling a portion of the resistance in the parallel circuit to the armature and controlled by the potential of the current flowing through said resistance, substantially as described.

In testimony whereof I have signed my name to this specification in the presence of two subscribing witnesses.

JOHN D. HILDER.

Witnesses:
  E. RICHENS,
  F. E. HUBBELL.